(12) United States Patent
Arthur et al.

(10) Patent No.: US 10,759,013 B2
(45) Date of Patent: Sep. 1, 2020

(54) DUST CONTAINMENT APPARATUS FOR AN AIR TOOL VACUUM DUST EXTRACTION SYSTEM

(71) Applicant: G.A.W. Inc., Romulus, MI (US)

(72) Inventors: Robert Arthur, Trenton, MI (US); Nathaniel P. Wenzel, Lyndhurst, OH (US); Kenan Wollborg, Inkster, MI (US); Nicholas J. Russell, Kirtland, OH (US)

(73) Assignee: G.A.W. Inc., Romulus, MI (US)

( * ) Notice: Subject to any disclaimer, the term of this patent is extended or adjusted under 35 U.S.C. 154(b) by 175 days.

(21) Appl. No.: 16/040,682

(22) Filed: Jul. 20, 2018

(65) Prior Publication Data

US 2019/0255671 A1   Aug. 22, 2019

Related U.S. Application Data

(60) Provisional application No. 62/631,563, filed on Feb. 16, 2018.

(51) Int. Cl.
*B25D 17/14* (2006.01)
*B23Q 11/00* (2006.01)
*B25D 17/20* (2006.01)

(52) U.S. Cl.
CPC .......... *B23Q 11/0046* (2013.01); *B25D 17/20* (2013.01); *B25D 2217/0057* (2013.01); *B25D 2222/72* (2013.01)

(58) Field of Classification Search
CPC ........... B23Q 11/0046; B23Q 11/0071; B25D 17/20; B25D 2217/0057; B25D 2217/0065
See application file for complete search history.

(56) References Cited

U.S. PATENT DOCUMENTS

| | | | | |
|---|---|---|---|---|
| 5,688,082 A | * | 11/1997 | Richardson | ........ B23Q 11/0046 408/113 |
| 5,738,177 A | * | 4/1998 | Schell | ..................... B25B 23/14 173/178 |
| 9,022,702 B2 | * | 5/2015 | Kasuya | .................. B25D 16/00 408/67 |
| 9,969,043 B2 | * | 5/2018 | Bergman | ........... B23Q 11/0071 |
| 2007/0261195 A1 | * | 11/2007 | Bleicher | ................. B08B 15/04 15/344 |
| 2007/0264091 A1 | * | 11/2007 | Bleicher | ............ B23Q 11/0046 408/58 |

(Continued)

*Primary Examiner* — Andrew M Tecco
*Assistant Examiner* — Eyamindae C Jallow
(74) *Attorney, Agent, or Firm* — Brooks Kushman P.C.

(57) ABSTRACT

A dust containment apparatus includes a tubular snorkel and dust bellows surrounding the implement of an air too, and a retention assembly housed within the snorkel that frictionally engages the implement to resist movement of the snorkel and bellows with respect to the implement. The retention assembly includes a set of friction members surrounding the radial periphery of the implement, and at least one resilient band that biases the friction members radially inward into pressing engagement with the implement. Preferably, the snorkel and friction members are constructed of non-magnetic material, and the friction members include permanent magnets that are magnetically attracted to the implement to augment the radially inward biasing of the resilient band.

20 Claims, 4 Drawing Sheets

(56) References Cited

U.S. PATENT DOCUMENTS

| | | | |
|---|---|---|---|
| 2008/0202781 A1* | 8/2008 | Nishikawa | B23Q 11/0046 173/104 |
| 2011/0008118 A1* | 1/2011 | Yoshikane | B23Q 11/0046 408/67 |
| 2012/0063856 A1* | 3/2012 | Miwa | B23Q 11/0046 408/67 |
| 2017/0066095 A1* | 3/2017 | Chen | B23Q 11/0071 |
| 2017/0368655 A1* | 12/2017 | Bergman | B23Q 11/0071 |

* cited by examiner

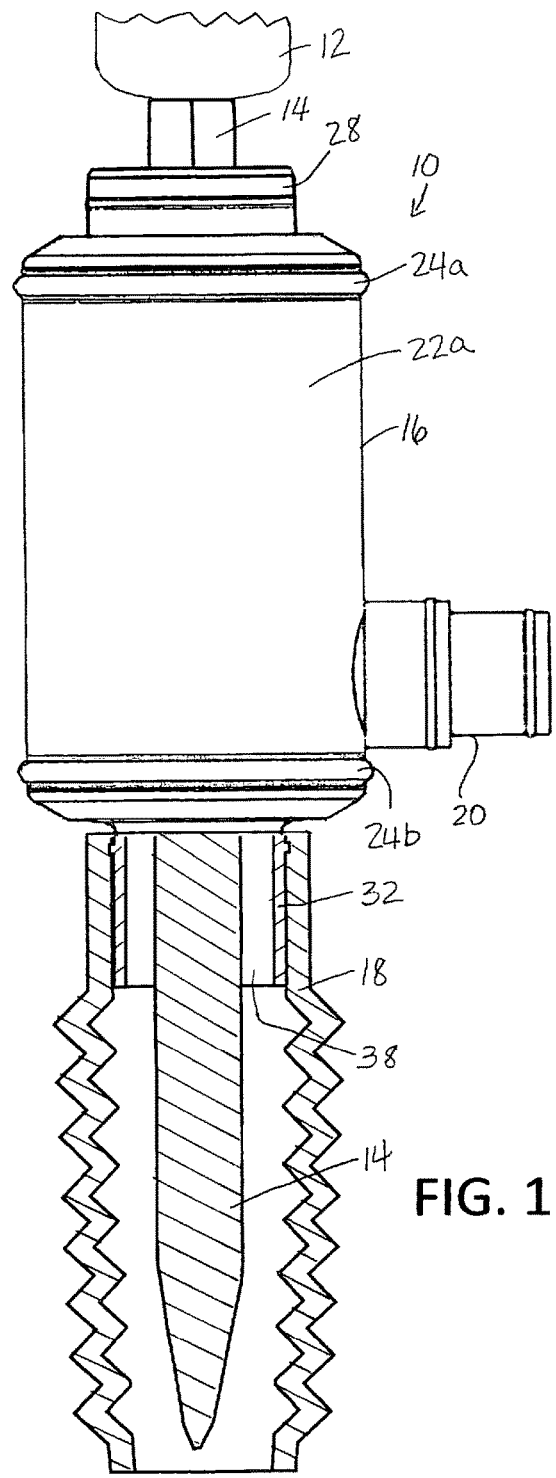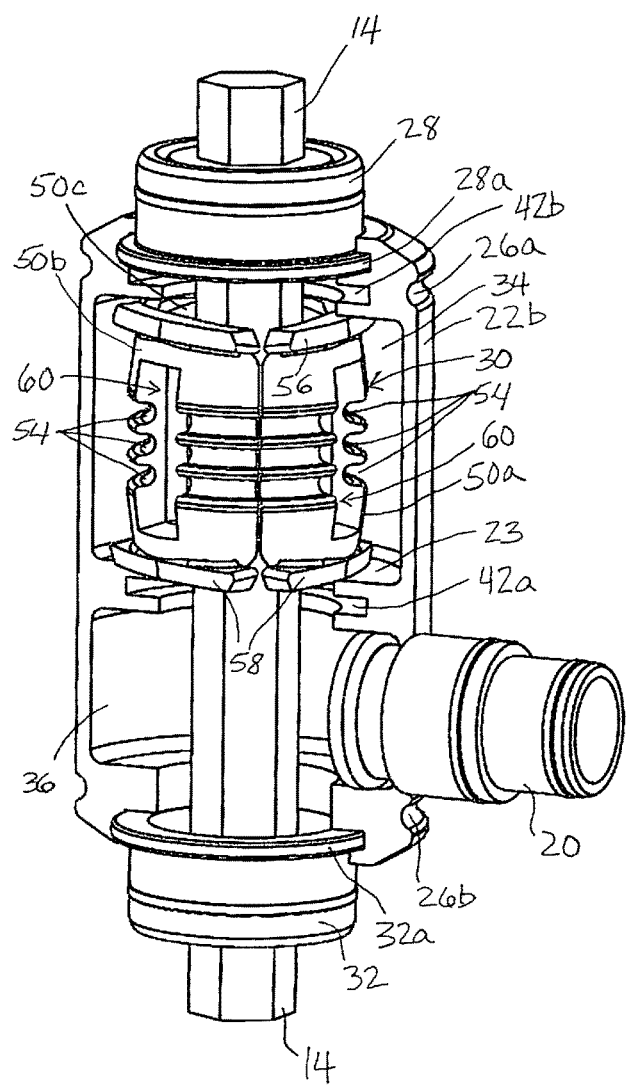
FIG. 1
FIG. 2

DUST CONTAINMENT APPARATUS FOR AN AIR TOOL VACUUM DUST EXTRACTION SYSTEM

RELATED APPLICATIONS

This application claims priority based on the Provisional Patent Application No. 62/631,563, filed Feb. 16, 2018.

TECHNICAL FIELD

This invention relates to a vacuum dust extraction system for a percussive air tool that collects and removes dust created by the impacting action of the air tool's implement on a workpiece, and more particularly to a dust containment apparatus that is slidingly retained on an implement driven by the air tool.

BACKGROUND OF THE INVENTION

Pneumatically operated percussive air tools such as hammers, pavement breakers, rivet busters, rock-drills and so forth are frequently used in industrial applications, and various expedients have been employed to minimize or contain airborne dust produced by the impacting action of the implement (a chisel or drill bit, for example) driven by the air tool. As disclosed, for example, in the U.S. Pat. No. 7,740,086 to Bleicher et al. and U.S. Pat. No. 9,022,702 to Kasuya et al., this can be achieved with a dust containment hood attached to the air tool's housing and a suction hose coupling the hood to an industrial vacuum.

Such a dust containment hood must be designed not only to effectively collect and extract the dust, but also for ease of attachment and removal from various kinds and types of air tools. In other words, a dust containment hood designed to work with one type or make of air tool will typically not work with other air tools. Accordingly, what is needed is a dust containment hood with a more universal attachment arrangement so that it can be readily used with different types and sizes of air tools.

SUMMARY OF THE INVENTION

The present invention is directed to an improved dust containment apparatus for an air tool vacuum dust extraction system that collects and removes dust created by the impacting action of the air tool's implement on a workpiece. The dust containment apparatus includes a tubular snorkel and dust bellows surrounding the air tool's implement, and a retention assembly within the snorkel that frictionally resists movement of the snorkel and bellows with respect to the implement. The retention assembly includes a set of friction members surrounding the radial periphery of the implement, and at least one resilient band that biases the friction members radially inward into pressing engagement with the implement. In a preferred embodiment, the snorkel and friction members are constructed of non-magnetic material, and the friction members include permanent magnets that are magnetically attracted to the implement to augment the radially inward biasing of the resilient band.

BRIEF DESCRIPTION OF THE DRAWINGS

FIG. 1 is a partial cross-sectional view of a percussive air tool equipped with the dust containment apparatus of this invention, including a clamshell snorkel according to a first embodiment of the present invention.

FIG. 2 is an isometric view of the clamshell snorkel of FIG. 1, with one of the housing halves removed.

DESCRIPTION OF THE PREFERRED EMBODIMENT

Figure 3:
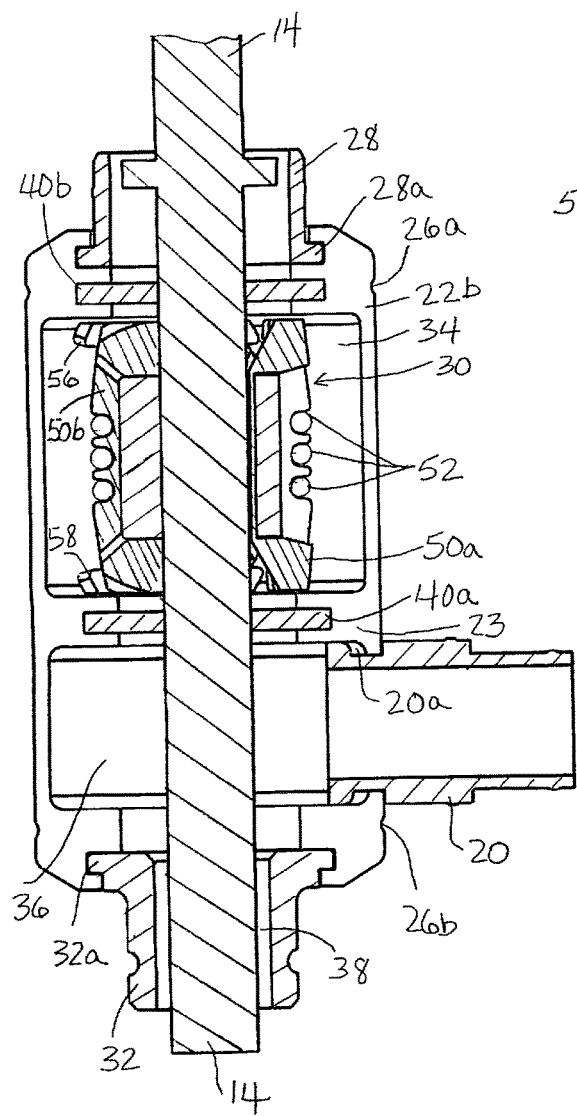
FIG. 3 is cross-sectional view of the snorkel of FIG. 2.

In general, the dust containment apparatus of this invention is applicable to most percussive air tools such as chipping hammers, riveting hammers, rivet busters, demolition tool drivers, pavement breakers, and so on. The dust containment apparatus is generally designated herein by the reference numeral 10, and for the sake of illustration, is illustrated in FIG. 1 in connection with a pavement breaker 12 equipped with a chisel 14, though only a small portion of the air tool 12 is depicted in FIG. 1. As used herein, the pavement breaker 12 is generally referred to as an air tool, and the chisel 14 is just one example of an implement that can be retained in, and percussively driven by, the air tool. Although not specifically illustrated herein, the apparatus 10 is also particularly useful in connection with percussive rock drills, even though in that case the air tool imparts both percussive and rotary motion to the implement (a masonry drill bit).

As depicted in FIG. 1, the dust containment apparatus 10 includes a tubular snorkel 16 and a flexible tubular dust bellows 18 with accordion-style pleating, both of which radially surround an outboard portion of the implement 14—that is, the portion of implement 14 that protrudes from the air tool 12. However, the implement 14 may be much longer than depicted, and in use, the apparatus 10 is generally positioned on the implement 14 such that the outboard end of the bellows 18 is in contact with the workpiece being impacted by the implement 14. The length of the bellows 18 may vary depending on the application, and in some cases, its length can be extended by joining another section of bellows to the outboard end of the depicted bellows 18. Also, it should be understood that the apparatus 10 constitutes part of an industrial dust extraction system including additional components (not shown) such as an industrial vacuum canister and a flexible suction hose coupling an outlet pipe 20 of snorkel 16 to the vacuum canister.

The heart of the present invention concerns the snorkel 16, and a retention assembly housed therein that frictionally resists movement of the snorkel 16 and bellows 18 with respect to the implement 14. In other words, the apparatus 10 is not fastened to the air tool 12, but can be positioned anywhere along the length of implement 14, as desired. In some cases, such as when moving the air tool 12 from one workpiece to another, the apparatus 10 can be moved upward with the snorkel 14 touching the end of the air tool 12; whereas in use, the apparatus 10 is positioned lower, with the end of the bellows 18 touching the workpiece in order to most effectively contain and remove dust from the vicinity of the implement's tip.

Figure 4:
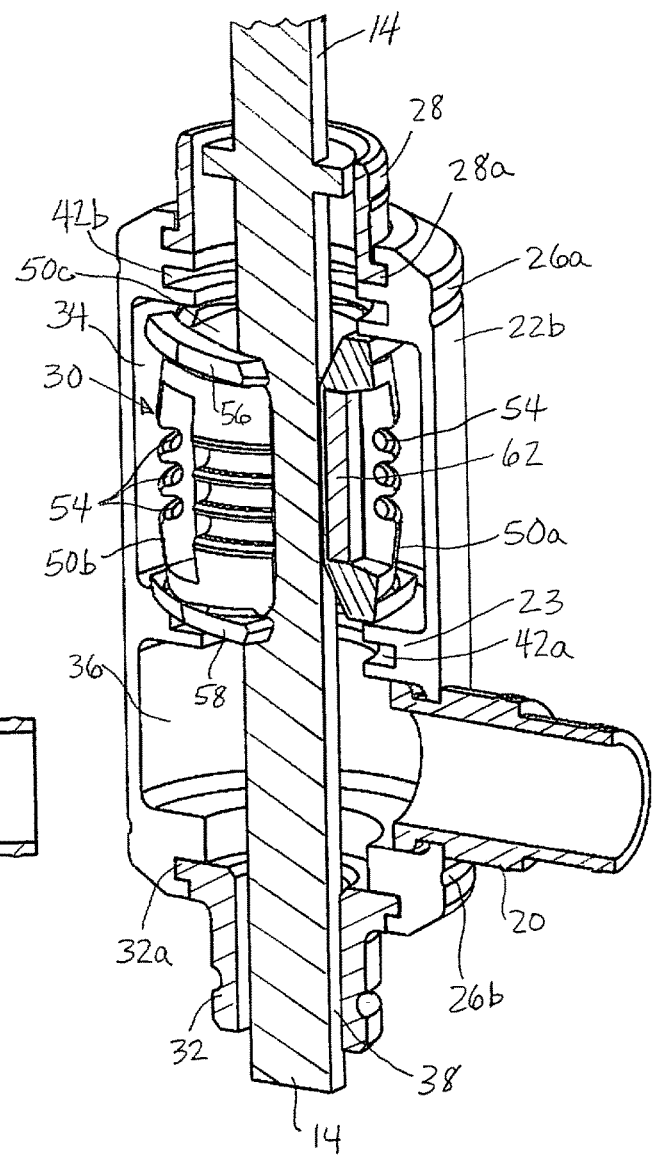
FIG. 4 is an isometric partial cross-sectional view of the snorkel of FIG. 2.
Figure 5:
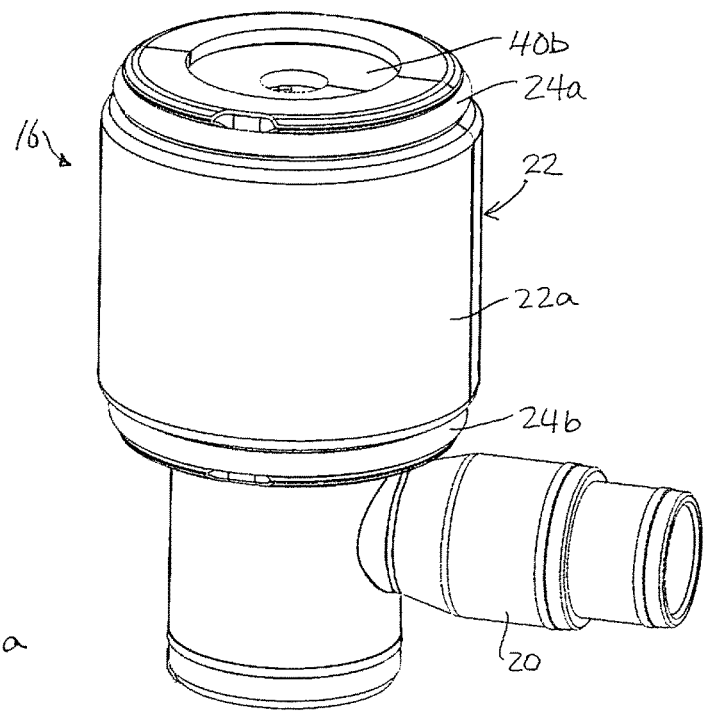
FIG. 5 is an isometric view of a clamshell snorkel according to a second embodiment of the present invention.
Figure 6:
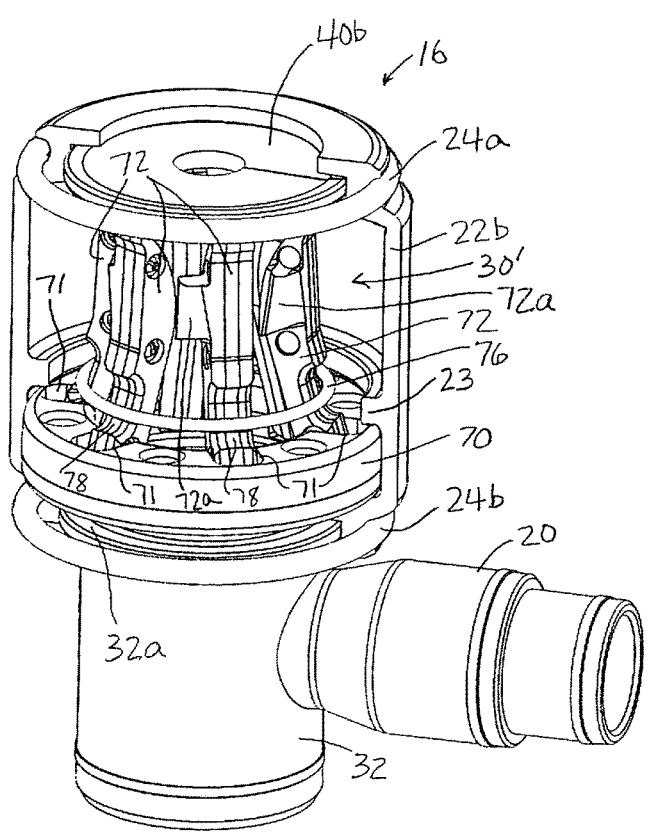
FIG. 6 is an isometric view of the clamshell snorkel of FIG. 5, with one of the housing halves removed.
Figure 7:
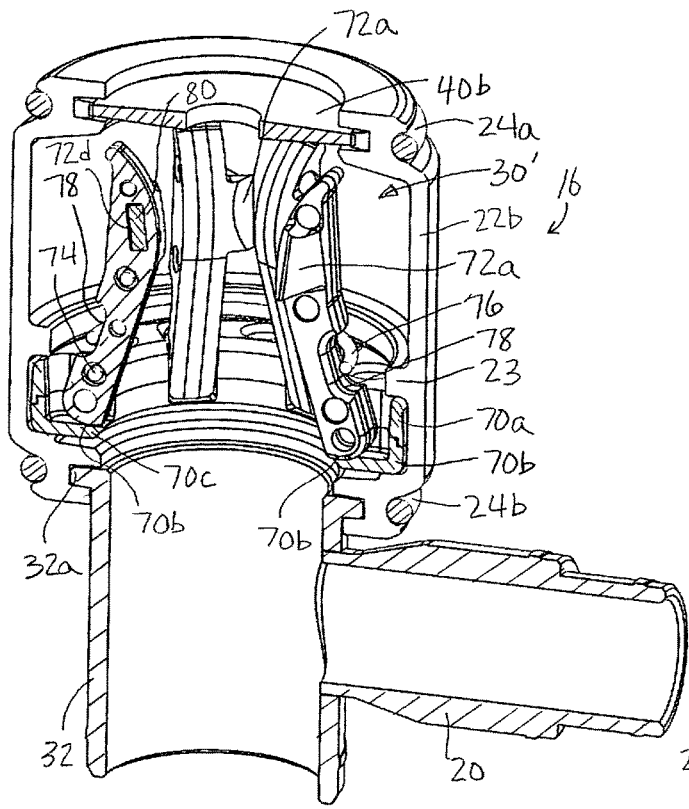
FIG. 7 is an isometric cross-sectional view of the snorkel of FIG. 5.
Figure 8:
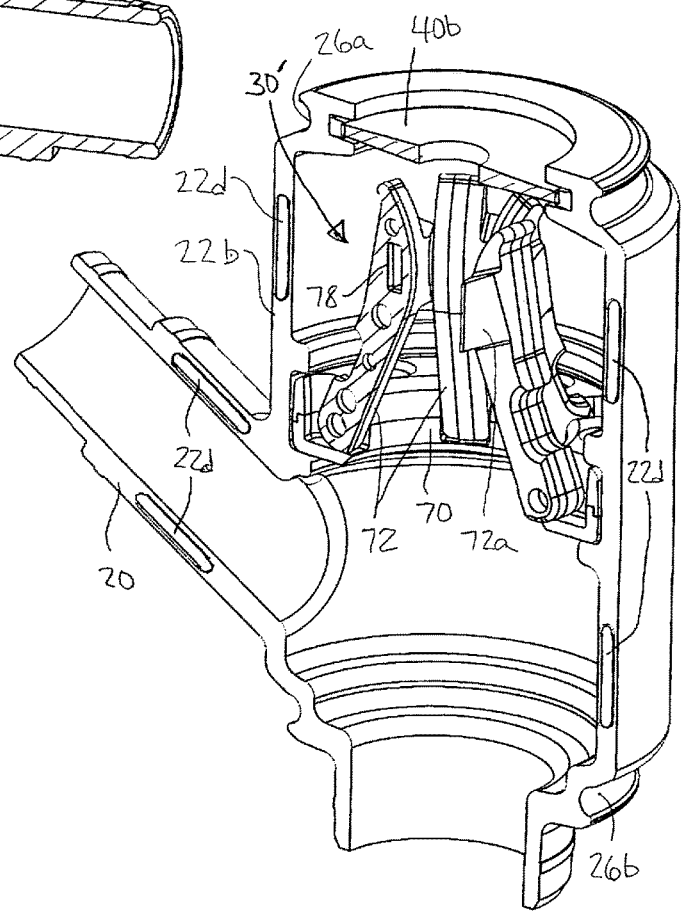
FIG. 8 is an isometric view of a clamshell snorkel according to a third embodiment of the present invention, with one of the housing halves removed.

Three somewhat different embodiments of the snorkel 16 are illustrated herein: a first embodiment is illustrated in FIGS. 1-4, a second embodiment is illustrated in FIGS. 5-7, and a third embodiment is illustrated in FIG. 8. In all three embodiments, the outer housing 22 of snorkel 16 is constructed in the manner of a clamshell—that is, of two halves joined and held together by a distributed set of O-rings seated in radial grooves 26a, 26b formed in the exterior periphery of the outer housing 22. Where appropriate, the housing halves are designated by the reference numerals 22a and 22b.

FIG. 2 illustrates the snorkel 16 of FIG. 1, with the housing half 22a removed, revealing the enclosed retention assembly, which is generally designated by the reference numeral 30. In this first embodiment, the housing halves 22a, 22b are designed to accommodate not only the retention assembly 30 and the shaft of implement 14, but also the flange 28a of an upper sleeve 28, the inboard end of outlet pipe 20, and the flange 32a of a lower sleeve 32. The upper and lower ends of the housing halves 22a, 22b are internally grooved as shown to capture the flanges 28a and 32a, and arcuate openings in the housing sidewalls capture the outlet pipe 20 by virtue of an annular recess 20a in the inboard periphery of outlet pipe 20. The upper sleeve 28 extends out of the housing 22, and is constructed of a durable material that will not be damaged when it comes into contact with the end of air tool 12 during its use. Also, as illustrated in FIGS. 3-4, the central bore of upper sleeve 28 is sufficiently large to accommodate a flange 14a which is often formed on the upper end of an implement 14. The lower sleeve 32 likewise extends out of the housing 22, in this case to provide an attachment point for the bellows 18 as illustrated in FIG. 1.

In this first embodiment, the inner periphery of snorkel 16 is provided with a central ledge 23 that effectively divides the interior volume of the housing 22 into two compartments or cavities: an upper compartment 34 in which the retention assembly 30 is disposed, and a lower compartment 36 that opens into the outlet port 20. Axial movement of retention assembly 30 within the compartment 34 is very limited as seen in FIGS. 2-4, but it is nevertheless free to rotate within compartment 34. Due to the suction (vacuum) applied to outlet pipe 20, dust created by percussive impingement of the implement 14 on a workpiece is drawn upward through the annular space 38 between implement 14 and the lower sleeve 32 (as best seen in FIGS. 3-4), into the snorkel's lower compartment 36, and exhausted to a dust collection site through the outlet pipe 20. One or more fiber or brush ring seals captured in the housing 22 minimize vacuum loss through the upper sleeve 28. As shown in FIG. 3, the illustrated snorkel 16 includes two such ring seals: a first ring seal 40a captured in an annular recess 42a of the central ledge 23, and a second ring seal 40b captured in an annular recess 42b in the upper end of housing 22 between the upper sleeve 28 and the upper compartment 34. For clarity, the ring seals 40a and 40b are omitted from the views of FIGS. 2 and 4.

As best seen in the isometric views of FIGS. 2 and 4, the retention assembly 30 comprises a set of three arcuate friction members or segments 50a, 50b, 50c arranged side-by-side to form a hollow sleeve through which the shaft of the chisel 14 passes. The segments 50a, 50b, 50c are fastened together—that is, in a fully collapsed state—by a set of three elastic O-rings 52 (illustrated in FIG. 3) seated in radial grooves 54 formed in the exterior periphery of each segment 50a, 50b, 50c. The O-rings 52 elastically bias the segments 50a, 50b, 50c radially inward, while allowing them to move radially outward as required to accommodate the outside diameter of the implement 14. Thus, the inner peripheries of the segments 50a, 50b, 50c are maintained in pressing frictional engagement with the outer radial periphery of the implement 14, to thereby frictionally resist movement of the snorkel 16 and bellows 18 with respect to the implement 14.

Each such segment 50a, 50b, 50c additionally includes upper and lower shoulders 56, 58 disposed adjacent the upper and lower boundaries of the compartment 34, a rectangular pocket 60 formed in its exterior periphery, and a permanent magnet 62 seated in the pocket 60. The permanent magnets 62 may be secured in the pockets 60 by a suitable adhesive, or a potting compound may be used to both secure the permanent magnets 62 and seal the pockets 60. The pockets 60 extend through most of the thickness of the segments 50a, 50b, 50c, leaving a thin wall of material separating the permanent magnets 62 from the open space through which the shaft of the implement 14 passes. The snorkel housing 22, as well as the segments 50a, 50b, 50c are constructed of a non-magnetic material such as an aluminum alloy, stainless steel, or plastic, so that the magnetic fields of the permanent magnets 62 extend into and through the steel of the implement 14. This creates a magnetic attraction between the segments 50a, 50b, 50c and the shaft of implement 14 that augments the radially inward biasing of the segments 50a, 50b, 50c produced by the elastic O-rings 52.

The second embodiment of the snorkel 16, illustrated in FIGS. 5-7, differs from the first embodiment of FIGS. 1-4 in three significant respects. First, the upper sleeve 28 is eliminated; second, the outlet pipe 20 is integrated into the sidewall of the lower sleeve 32 instead of being captured in the sidewall of the clamshell housing 22; and third, retention assembly 30 incorporates pivotably mounted fingers or arms 72 in place of the segments 50a, 50b, 50c. While the first and second differences are self-evident from the drawings and the above description, the third difference requires explanation, and is described in detail below. Another, albeit minor, difference is that the lower fiber or brush ring seal 40a is also eliminated, leaving only the upper ring seal 40b.

Referring to FIGS. 6-7, the retention assembly of this second embodiment is generally designated by the reference numeral 30' instead of 30. The retention assembly 30' comprises an annular base ring 70 and a set of six fingers or arms 72, each such arm 72 being pivotably mounted at one end (the lower end, as viewed in FIGS. 6-7) in a pocket 71 of the base ring 70. The base ring 70 is axially retained in the clamshell housing 22 by the ledge 23, which in this case is disposed near the lower end of the housing 22. The spacing between the ledge 23 and the bottom of the clamshell housing 22 is slightly larger than the axial dimension of the base ring 70 so that, as with the first embodiment 30, the retention assembly 30' is free to rotate with respect to the housing 22; so if the implement 14 has a hexagonal profile (as many do), the retention assembly 30' tends to rotate as required so that the arms 72 engage the flats of the implement's shaft for maximal frictional contact.

As shown in the partial cross-sectional view of FIG. 7, the base ring 70 is constructed of upper and lower rings 70a and 70b in which are captured a set of pivot pins 74 for the arms 72, one of such pivot pins 74 being visible in the view afforded by FIG. 7. The arms 72 each pivot inward about the pivot pins 74 under the bias of an elastic band 76 (one or more rubber O-rings in the illustrated embodiment) seated in grooves 78 formed in the outer peripheries of the arms 72. That is, the band 76 elastically biases the upper ends of the arms 72 radially inward, while allowing them to move radially outward as required to accommodate the outside diameter of the implement 14. And this pressing frictional engagement of the arms 72 with the radial periphery of the implement 14 resists movement of the snorkel 16 and bellows 18 with respect to the implement 14.

In the absence of an implement 14, or when the apparatus 10 is removed from the implement 14, the arms 72 pivot further inward; in particular, each of the arms 72 includes a laterally extending wing 72a that will abut the side of an adjacent arm 72 when permitted to pivot inward sufficiently. Additionally, inward movement of the arms 72 may be mechanically limited by providing a flat 72b (see FIG. 7) on the lower end of each arm 72 that contacts the bottom or floor 70c of the lower ring 70b once the arm 72 has pivoted inward by a set amount. These stop features prevent the arms 72 from collapsing fully inward when an implement 14 is removed, and enable the implement 14 to be easily inserted through the retention assembly 30' without damaging the arms 72.

As seen in FIGS. 6-7, the arms 72 are laminated, each arm 72 comprising a set of three laminations. In each arm 72, the center lamination has a rectangular through-hole 72d in upper portion of the arm 72 in proximity to where the arm 72 engages the implement 14, as seen in the cross-section of FIG. 7. And the laminations on either side of the center lamination wall off the through-hole 72d to form a pocket in which is disposed a permanent magnet 80. The arm laminations are constructed of a non-magnetic material such as an aluminum alloy, stainless steel, or plastic, and the permanent magnets 80 create a magnetic attraction between arm 72 and a ferrous implement 14 passing through the retention assembly 30'. This magnetic attractive force augments the inward biasing of the arms 72 produced by the elastic band 76. In terms of material selection, at least the center lamination of each arm 72 is constructed of a durable non-magnetic material such as stainless steel to prevent arm wear due to rubbing contact of the arms 72 on the periphery of the implement 14.

Finally, the third embodiment of the snorkel 16, illustrated in FIG. 8, differs from the other embodiments in that it is formed by joining two housing halves 22a and 22b in the manner of a clamshell. The housing halves 22a, 22b are formed by molding or casting; this allows the outlet pipe 20 and the lower sleeve 32 to be integrated into the housing 22 as shown. As with the other embodiments, the fiber seal 40b and the retention assembly 30/30' are captured between the clamshell housing halves 22a and 22b. As also shown in FIG. 8, the mating surfaces of the clamshell housing halves 22a and 22b are provided with alignment locking features such as the raised pill-shaped projections 22d, which are received in corresponding pockets (not shown) formed on the other clamshell housing half. And as in all of the embodiments, the clamshell housing halves 22a and 22b are held together by a distributed set of O-rings seated in radial grooves 26a, 26b formed in the exterior periphery of the housing 22.

In summary, the dust containment apparatus of the present invention provides an easily used and more universal air tool accessory for collecting and extracting dust created by an implement percussively impacting a workpiece. The various elements of the apparatus may be constructed of metal or plastic, as appropriate, and of course, it will be recognized that while our invention has been described in reference to the illustrated embodiment, numerous modifications and variations in addition to those mentioned herein will occur to those skilled in the art, and still fall within the intended scope of the invention.

The invention claimed is:

1. Dust containment apparatus for a percussive air tool that imparts percussive motion to an implement retained in one end of the air tool, the dust containment apparatus comprising:
   a tubular snorkel and dust bellows surrounding the implement for containing dust produced when said implement impacts a workpiece; and
   a retention assembly disposed within the snorkel about the implement, said retention assembly having,
      a plurality of friction members distributed about a radial periphery of said implement and in pressing engagement with the radial periphery of the implement to thereby frictionally resist movement of the snorkel and dust bellows with respect to the implement, and
      at least one elastic band biasing said friction members radially inward into pressing engagement with the radial periphery of said implement.

2. The dust containment apparatus of claim 1, where:
   an outboard radial periphery of each of said friction members has a groove formed therein; and
   said elastic band is seated in the grooves formed on the outer radial peripheries of said friction members to bias said friction members radially inward.

3. The dust containment apparatus of claim 1, further comprising:
   limit features that limit the radial inward movement of said friction members.

4. The dust containment apparatus of claim 1, where:
   said snorkel is a clamshell of two-halves that are joined and secured together to capture said retention assembly therein.

5. The dust containment apparatus of claim 4, where said snorkel includes an outlet pipe coupled to a vacuum for sucking dust out of said bellows and snorkel, and where:
   said clamshell halves are coupled to said bellows; and
   said clamshell halves are joined and secured together to capture said outlet pipe in a sidewall of said clamshell.

6. The dust containment apparatus of claim 4, where said apparatus includes an outlet pipe coupled to a vacuum for sucking dust out of said bellows and snorkel, and where said apparatus further comprises:
   a lower sleeve disposed between said snorkel clamshell and said bellows, where one end of said lower sleeve is captured in said snorkel clamshell, and said outlet pipe is formed in a sidewall of a lower sleeve.

7. The dust containment apparatus of claim 4, where said apparatus includes an outlet pipe coupled to a vacuum for sucking dust out of said bellows and snorkel, and where:
   the snorkel clamshell halves are constructed by molding or casting, including said outlet pipe.

8. The dust containment apparatus of claim 1, where said snorkel includes an outlet pipe coupled to a vacuum for sucking said dust out of said snorkel and bellows, and where:
   said snorkel includes an upper sleeve facing said air tool; and
   said retention assembly is disposed between said outlet pipe and said upper sleeve.

9. The dust containment apparatus of claim 8, further comprising:
   a fiber or brush ring disposed in said snorkel about said implement to minimize vacuum loss through said upper sleeve.

10. The dust containment apparatus of claim 1, where:
said snorkel and said friction members are constructed of a non-magnetic material; and
said friction members include permanent magnets that are magnetically attracted to said implement to augment the radially inward biasing of said elastic band.

11. The dust containment apparatus of claim 10, where:
said permanent magnets are embedded in said friction members.

12. Dust containment apparatus for a percussive air tool that imparts percussive motion to an implement retained in one end of the air tool, the dust containment apparatus comprising:
a tubular snorkel and dust bellows surrounding the implement for containing dust produced when said implement impacts a workpiece; and
a retention assembly disposed within the snorkel about the implement, said retention assembly having,
a base ring disposed within the snorkel about the implement,
a plurality of arms distributed about a circumference of said base ring, each arm pivotably mounted in said base ring and in pressing engagement with a radial periphery of the implement to thereby frictionally resist movement of the snorkel and dust bellows with respect to the implement, and
an elastic member that biases said arms to pivot radially inward into pressing engagement with the radial periphery of the implement.

13. The dust containment apparatus of claim 12, where:
said snorkel and said arms are constructed of a non-magnetic material;
each of said plurality of arms has a first end pivotably mounted in said base ring, and a second end biased into engagement with the radial periphery of said implement; and
the second end of each arm includes a permanent magnet that is magnetically attracted to said implement to augment the radially inward biasing of said elastic band.

14. The dust containment apparatus of claim 12, where:
each of said plurality of arms includes a laterally depending wing that engages an adjacent one of said arms when said implement is removed from said snorkel to limit an inward radial movement of said arms.

15. Dust containment apparatus for a tool that includes an implement retained in one end of the tool, the dust containment apparatus comprising:
a tubular snorkel and dust bellows surrounding the implement for containing dust produced when said implement impacts a workpiece; and
a retention assembly disposed within the snorkel about the implement, said retention assembly having a plurality of arms disposed radially about the implement, wherein each of the plurality of arms is configured to engage a radial periphery of the implement to frictionally resist movement of the snorkel and dust bellows with respect to the implement, and wherein each arm is biased radially inward into pressing engagement with the radial periphery of the implement.

16. The dust containment apparatus of claim 15, wherein the retention assembly further comprises a base ring disposed within the snorkel and about the implement, the plurality of arms are secured to and distributed about a circumference of said base ring, and the plurality of arms are configured to pivot relative to the base ring to engage the radial periphery of the implement.

17. The dust containment apparatus of claim 15, wherein each of the plurality of arms is configured to engage one a plurality of flat surfaces defined on the radial periphery of the implement.

18. The dust containment apparatus of claim 15, wherein the retention assembly further comprises a plurality of permanent magnets, wherein one of the plurality of magnets are attached to one of the plurality of arms, and wherein each of the plurality of magnets are attracted to said implement to augment the radially inward biasing of each of the plurality of arms.

19. Dust containment apparatus for a tool that includes an implement retained in one end of the tool, the dust containment apparatus comprising:
a tubular snorkel and dust bellows surrounding the implement for containing dust produced when said implement impacts a workpiece; and
a retention assembly disposed within the snorkel about the implement, said retention assembly having a plurality of arms disposed radially about the implement, wherein each of the plurality of arms is configured to engage a radial periphery of the implement to frictionally resist movement of the snorkel and dust bellows with respect to the implement, and wherein each arm includes a magnet that biases each arm radially inward into pressing engagement with the radial periphery of the implement.

20. The dust containment apparatus of claim 19, wherein the retention assembly further comprises a base ring disposed within the snorkel and about the implement, the plurality of arms are secured to and distributed about a circumference of said base ring, and the plurality of arms are configured to pivot relative to the base ring to engage the radial periphery of the implement.

* * * * *